UNITED STATES PATENT OFFICE.

ARNOLD H. C. HEITMANN AND ERIK C. CLEMMENSEN, OF DETROIT, MICHIGAN, ASSIGNORS TO PARKE, DAVIS & COMPANY, OF DETROIT, MICHIGAN, A CORPORATION OF MICHIGAN.

ÆTH-OXY-PHENYL-CAMPHORYL IMID AND PROCESS OF MAKING SAME.

No. 824,357.    Specification of Letters Patent.    Patented June 26, 1906.

Application filed August 14, 1905. Serial No. 274,158. (Specimens.)

*To all whom it may concern:*

Be it known that we, ARNOLD H. C. HEITMANN, a citizen of the United States of America, and ERIK C. CLEMMENSEN, a subject of the King of Denmark, residing at Detroit, in the county of Wayne and State of Michigan, have invented certain new and useful Improvements in Æth-Oxy-Phenyl-Camphoryl Imid and Process of Making Same, of which the following is a specification.

The invention relates to pharmaceutical products of that class known as "antipyretics," the physiological effect of which is to reduce temperature.

It is the object of the invention to obtain a compound which has the desired characteristics and is free from some of the detrimental qualities of products heretofore used for this purpose. For example, the compound known as "acetanalid" is an antipyretic; but it has poisonous properties, which render its use injurious. Again, certain compounds which have antipyretic properties also have the effect of heart depression, and therefore cannot be safely used in many cases.

It is the essential object of the present invention to obtain a compound which, on the one hand, is free from poisonous properties, and, on the other hand, slightly increases rather than decreases vital action, while at the same time it possesses strong antipyretic properties. This object we have attained, first, by selecting two substances, one of which has the desired antipyretic qualities and the other the physiological effect of increasing vital action, and, secondly, by chemically uniting these bodies so as to effect a molecular union.

The invention therefore consists, first, in a new substance combining in molecular union substances having, respectively, the desired physiological characteristics; second, in a new class of chemical compounds which fulfil the necessary conditions; third, in a new specific chemical compound, and, fourth, in the process for manufacturing the same.

The new class of chemical compounds which we have obtained as a part of our invention may be broadly designated as "phenyl-camphoryl imids" or "camphoryl-phenyl amids." The essential chemical characteristic is the presence in molecular union of a phenyl radical and a camphoryl radical connected by the imido or the amidio groups and may be generally represented by the formula: $(camphoryl)_x N(phenyl)_x$. These compounds may be formed in various ways, but we preferably employ the following process and will describe the same as used for forming the specific product which is æth-oxy-phenyl-camphoryl imid and may be considered as a condensation product of amido-phenetol and camphoric acid. The ingredients, preferably camphoric-acid anhydrid and amido-phenetol, are mixed in molecular proportion and subjected to heat, preferably for several hours. The substances may thus be directly combined; but the reaction is facilitated by the presence of a solvent of high boiling-point—as, for instance, xylol. The reaction which takes place may be represented as follows:

$$C_6H_{13}\underset{CO}{\overset{CO}{\diagup}}O + C_6H_5OC_2H_5NH_2 =$$

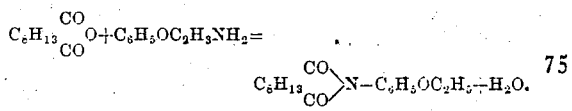

In the above reaction one molecule of amido-phenetol combines with one molecule of camphoric-acid anhydrid, one of water being spilled off, thus forming one molecule of the desired product—viz., æth-oxy-phenol-camphoryl imid. To form the pure product, the xylol is distilled off and the residue purified by crystallization from a solvent such as diluted alcohol—viz., one volume of alcohol and one of water. The yield is nearly theoretical.

As a modification of the process the ingredients may be combined by a suitable condensing agent, such as phosphorous chlorids, fuming sulfuric acid, &c. For example, the camphoric acid and the amido-phenetol may be mixed with phosphorous trichlorid in molecular proportion or preferably with an excess of the phosphorous trichlorid, the result of the reaction being the desired product—phosphorous acid and hydrochloric-acid gas.

In a further modification of the process the compound may be obtained by condensing amido-phenol with camphoric-acid anhydrid and in alkylating the condensed phenolic body.

In still another modification camphoryl imid may be condensed with phenetol. We do not, however, deem this process as direct or as desirable as the ones previously described, inasmuch as the camphoryl imid is not as easily formed as the amido-phenetol.

In the various processes above given any of the camphoric acids may be used. The molecule may also be variously alkylated, but preferably to contain the oxy-ethyl group.

The product obtained is characterized by the following properties: It appears in the form of colorless silky needles, melting at a temperature of 119° centigrade, is odorless, tasteless, quite insoluble in cold water, slightly soluble in hot water, readily in warm diluted alcohol, and very readily in organic solvents, such as alcohol, ether, chloroform, petroleum ether, acetone, and benzol. It is insoluble in water containing alkalies or acids. On warming with concentrated acid or alkaline solutions it is not decomposed. It is slightly volatile at higher temperatures.

In its physiological effects the new substance possesses the action of an antipyretic and an analgesic. So far as we understand the reaction which takes place in the animal system is, first, the gradual disassociation of the amido-phenetol and the camphoric-acid radicals, permitting each to operate separately and to produce its characteristic physiological effect. Thus the amido-phenetol possesses strongly antipyretic qualities, while the camphoric acid has the effect of increasing vital action. The physiological effect is, however, quite different from that which would be produced by a mixture of the camphoric acid and amido-phenetol uncombined, and this is probably due to the gradual release of these substances from the combined molecule which prevents a too energetic action of the amido-phenetol.

The dose is from 0.5 to one gram per ounce.

What we claim as our invention is—

1. The herein-described substance, the same being a condensation product of camphoric acid and amido-phenetol, which is characterized by antipyretic and analgesic properties; in its pure form it appears in silky needles, melting at a temperature of 119° centigrade, is colorless, odorless, tasteless, insoluble in cold water, slightly soluble in warm water, readily soluble in hot diluted alcohol, and very readily in organic solvents, such as alcohol, ether, chloroform, acetone, benzol, petroleum ether; is insoluble in acid or alkali solutions and is not decomposed therein.

2. The process of forming camphoryl-alkyl-oxy-phenyl amids, which consists in condensing two substances respectively containing the camphoryl and the alkyl-oxy-phenyl radical and one of said substances being an amin, the condensation being effected by heat and in the presence of a solvent of high boiling-point.

In testimony whereof we affix our signatures in presence of two witnesses.

ARNOLD H. C. HEITMANN.
ERIK C. CLEMMENSEN.

Witnesses:
JAMES P. BARRY,
AMELIA WILLIAMS.